2 Sheets—Sheet 1.

L. S. SCHANCK.
Insect-Destroyer.

No. 215,683. Patented May 20, 1879.

Attest:
LaFayette S. Schanck.
Inventor.

By H. L. Perrine,
Atty.

2 Sheets—Sheet 2.
L. S. SCHANCK.
Insect-Destroyer.
No. 215,683. Patented May 20, 1879.
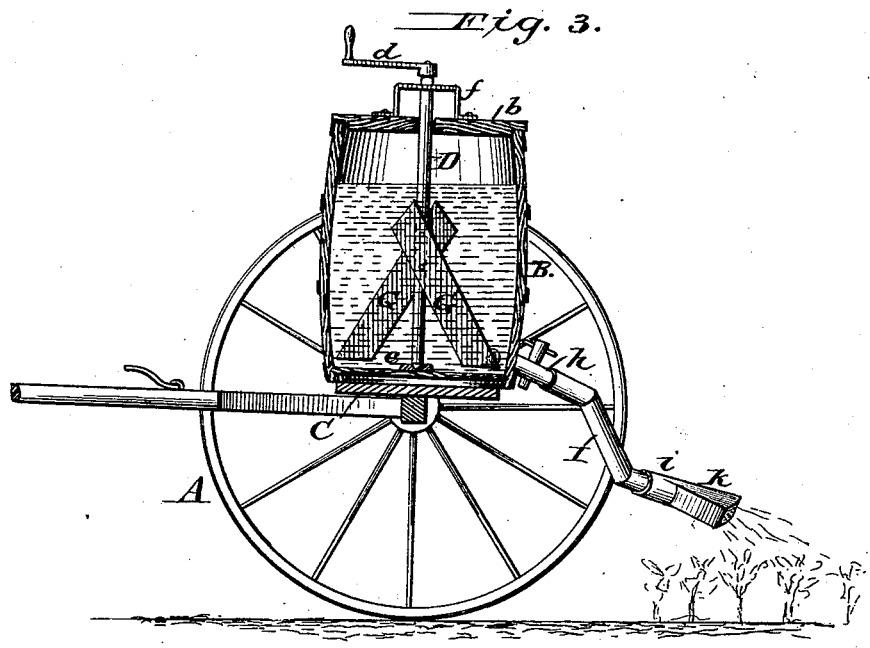
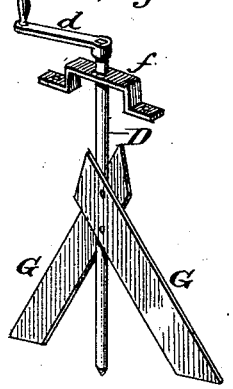
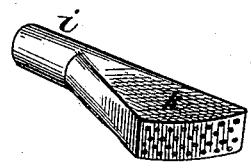
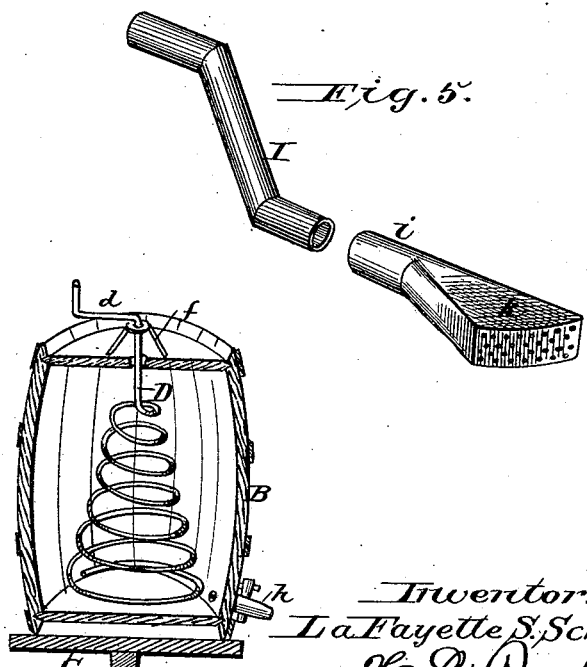
Attest:
A. M. Long.
Wm. G. Henderson.
Inventor.
LaFayette S. Schanck
By H. L. Perrine
Atty.

UNITED STATES PATENT OFFICE.

LA FAYETTE S. SCHANCK, OF MARLBOROUGH, NEW JERSEY.

IMPROVEMENT IN INSECT-DESTROYERS.

Specification forming part of Letters Patent No. 215,683, dated May 20, 1879; application filed April 12, 1879.

*To all whom it may concern:*

Be it known that I, LA FAYETTE S. SCHANCK, of Marlborough, in the county of Monmouth and State of New Jersey, have invented certain new and useful Improvements in Machines for Destroying Insects; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improved apparatus for sprinkling potato-vines with paris-green or other poisons in solution or mixed with water, for the purpose of destroying potato-bugs or other insects.

The object is to facilitate the sprinkling of the vines by providing for the simultaneous sprinkling of several rows by an apparatus traversing the field by horse-power, and thus to dispense with the laborious and expensive method of sprinkling a single row of vines at a time by hand with a sprinkling-pot.

The prevalence of the potato-bug in certain sections of the country, and the necessity of sprinkling the vines by hand, for lack of a more expeditious means, has, as is well known, rendered the profitable cultivation of the potato in those sections impossible.

Sprinkling-tanks mounted on wheels have heretofore been used for sprinkling poisoned water upon the rows of potato-plants; and my invention consists in a novel construction and arrangement of the discharge-pipes and delivering-sprinklers of these tanks, whereby they are rendered adjustable, so as to be used effectively in fields having the rows at different distances apart, as will be hereinafter described.

I refer to the following particular description and the accompanying drawings, in which—

Figure 1:
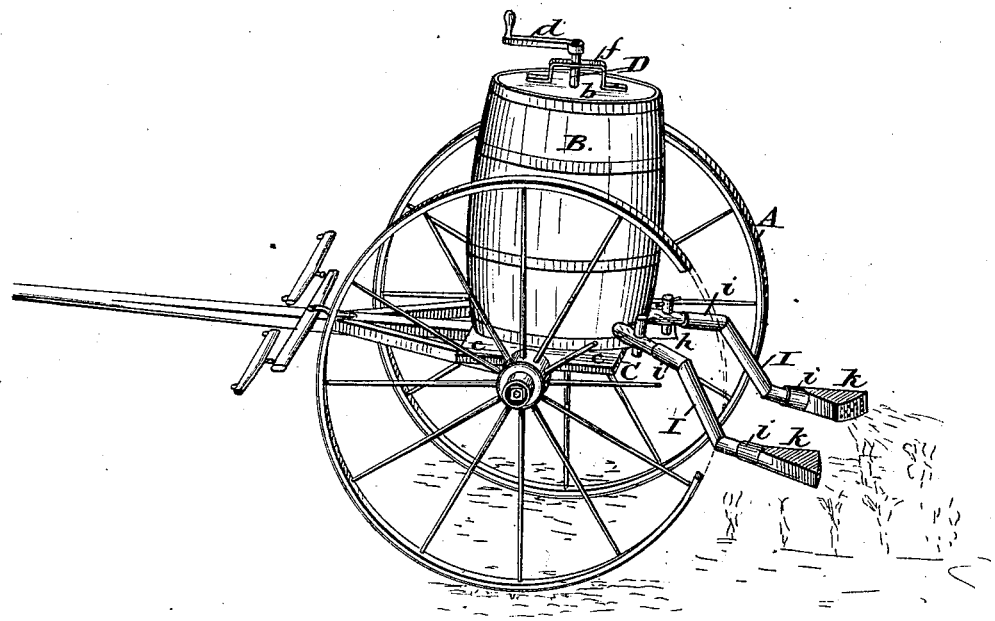
Figure 2:
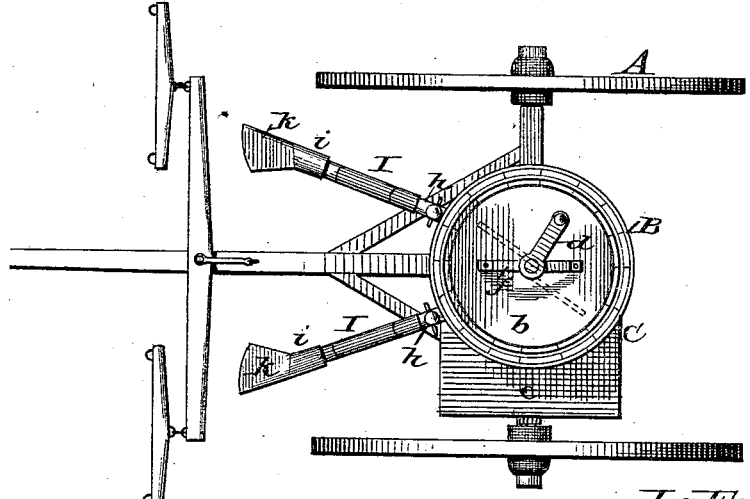

Figure 1 is a perspective view of my invention. Fig. 2 is a plan view of the same. Fig. 3 is a central vertical section of the apparatus, the stirring shaft and blades being shown in full lines. Fig. 4 is a detached perspective view of the stirring device. Fig. 5 is a detached perspective view of one of the leading-pipes and its perforated sprinkler. Fig. 6 is a modified form of the stirring or mixing device.

The letter A indicates the vehicle, which may consist of the rear truck or section of the running-gear of an ordinary farm-wagon. B is the tank for holding the mixture of water and paris-green or other poison. This tank I prefer to make of an ordinary water-tight barrel, such as a vinegar or pork barrel, and it is mounted and may be held in any convenient manner upon a platform, C, secured to the axle of the truck, this platform being of sufficient size to also afford standing room, c, for the driver, who also operates the shaft D by means of the crank d. This shaft D is stepped in a bearing, e, at the center of the bottom of the tank. Its upper end passes through an aperture in the center of the removable lid b of the tank, and it has its upper bearing in a bracket, f, secured upon said lid.

The shaft D is provided with two flat blades, G, secured to it near its middle, and inclining outwardly and downwardly in opposite directions, and terminating near the bottom and wall of the tank. The lower ends of these blades are beveled or cut obliquely to the sides, so that said ends will be about parallel with the bottom of the tank, and have an extended sweep, which will effectually prevent the settling or precipitation to any extent of the poisonous substance upon said bottom.

Near the bottom of the tank are inserted two faucets, h h, in the wall thereof. These faucets are at such distance apart and diverging to such a degree that when the bent leading-pipes I I are secured to the ends thereof said pipes will diverge sufficiently to bring the sprinklers k k each over a row of potato-vines, as ordinarily planted, when the apparatus is in use. The faucets I prefer to make of wood, as being cheaper than metal, and they are easily driven into auger-holes in the tank-wall.

The leading-pipes I I are made of tin, and the ends of each are bent at angles in opposite directions to the main portions. The sprinklers k k are also made of tin, and have necks i, which fit upon the outer ends of the leading-pipes, and may be turned thereon, as also the inner ends of the pipes may be turned upon the faucets.

By having the pipes I I bent as described, it will be observed that they may be adjusted to bring the sprinklers at any desired distance apart, or at any distance from the ground, within certain limits, so that a very cheap adjustable apparatus is produced, which may be arranged to meet any conditions ordinarily incident to farming, and the apparatus is thus adapted for use in sprinkling or watering any crops in rows or hills.

It will be observed in Fig. 2 the pipes I I extend forward instead of rearward, and the tank should be secured in such a manner as to admit of its being turned to bring these pipes to the front or rear, as desired. The arrangement of the pipes in front is the preferable mode, as it enables the finishing out the ends of the rows better than when they extend to the rear.

The wheels of the truck will ordinarily straddle two rows of potato-vines, and when two horses are used they should be hitched far enough apart to have two rows between them.

When one horse is used, however, he will travel between the two rows operated upon by a two-pipe apparatus.

It will be observed that the tank may be supplied with more than two leading-pipes, if desired, and that one pipe with two or more branches may be used without departing from the principle of my invention.

When the apparatus is to be used, the tank is supplied with a proper quantity of water, the paris-green or other poison is placed in it, the lid placed upon the tank, with the shaft D properly stepped in its bearing, and then the driver, perched upon the platform, turns the crank $d$, thereby thoroughly mixing the poison with the water. The faucets are then turned to permit the proper volume of poisoned water to flow and the horses are started. After the poison is once mixed with the water, a moderate turning of the shaft, by means of the crank, during the progress of the truck, will prevent the settling of the poisonous substance to the bottom, which it (paris-green especially) would do if not continually stirred.

In Fig. 6 I have shown a modified form of mixer constructed of a single piece of stout wire, bent or coiled as shown, which can be inserted through a hole in the center of the head of cask or tank, thereby avoiding making a removable head.

Having now described the construction and operation of my invention, what I claim is—

The combination, with the tank, substantially as described, of the faucets $h\,h$, the pipes I I, having their ends bent in opposite directions and capable of turning on said faucets, and the sprinklers $k\,k$, having the necks $i$, and capable of turning on said pipes, substantially as and for the purpose set forth.

In testimony that I claim the foregoing as my own I affix my signature in presence of two witnesses.

LA FAYETTE S. SCHANCK.

Witnesses:
  SAML. C. COWART,
  JO. C. ARROWSMITH.